July 22, 1924.

R. M. ABRAHAM

THEODOLITE, SPECTROSCOPE AND THE LIKE

Filed May 12, 1923

INVENTOR
Robert M. Abraham
By Hubert A. Gill
Attorney

July 22, 1924.

R. M. ABRAHAM

THEODOLITE, SPECTROSCOPE AND THE LIKE

Filed May 12, 1923     3 Sheets-Sheet 2

1,502,223

INVENTOR
Robert M. Abraham
By Hubert A. Gill
Attorney

Fig. 5.
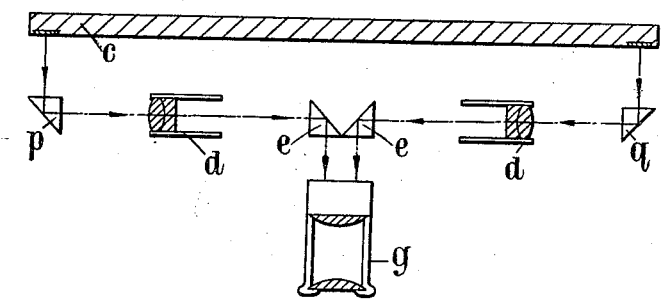
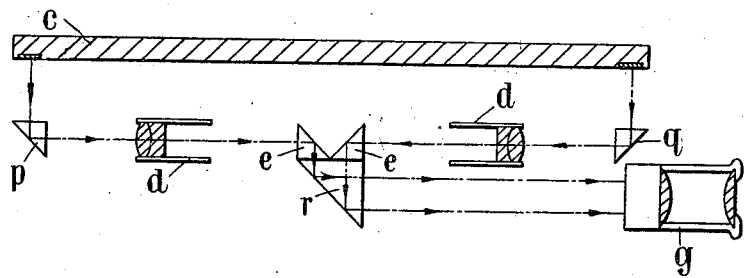
Fig. 6.

Patented July 22, 1924.

1,502,223

UNITED STATES PATENT OFFICE.

ROBERT M. ABRAHAM, OF WESTMINSTER, LONDON, ENGLAND.

THEODOLITE, SPECTROSCOPE, AND THE LIKE.

Application filed May 12, 1923. Serial No. 638,530.

*To all whom it may concern:*

Be it known that I, ROBERT MORRISON ABRAHAM, a British subject, and resident of 49 and 50 Parliament Street, Westminster, S. W. 1, in the county of London, England, have invented certain new and useful Improvements in Theodolites, Spectroscopes, and the like (for which I have filed an application in England, dated 5th July, 1922), of which the following is a specification.

This invention relates to theodolites, spectroscopes and like instruments furnished with a movable telescope or similar optical sighting apparatus. It is the object of this invention to enable such an instrument, hereinafter referred to for convenience as a theodolite, to have two opposite points on a scale indicating its angular position read simultaneously. In theodolites as most generally made hitherto it has been usual to take two readings on a scale for each position of the telescope to be determined, this being necessary because the graduated scales cannot be centered with absolute mechanical accuracy. The scale is therefore read at diametrically opposite points, and the average of the two readings is used.

The so-called vertical scale of the theodolite for showing elevation and which therefore turns with the telescope tube around the horizontal axis, presents most difficulty in the way of arranging for the simultaneous reading of two diametrically opposite points and the present invention is concerned with the provision of means for reading this scale at two opposite points simultaneously when viewed through an eye-piece disposed in the horizontal axis of the instrument. It may be mentioned here that suggestions have been made to provide optical systems whereby readings on two opposite parts of a scale may be viewed simultaneously, but as far as we are aware such optical systems which have been devised hitherto have always been of a very complicated nature due to the necessity of not interfering with the telescope bearings.

According to the present invention, an optical system associated with the vertical scale of a theodolite is so arranged that the light from two opposite portions of the scale is directed to a point within the telescope bearing, at which point the light is reflected direct through the bearing itself in an axial direction. This light may then pass directly into an eyepiece or may be reflected again before passing into the eyepiece. In the former case, a convenient arrangement is obtained by providing a vertical scale conical in form and microscope tubes carried by the bearing and disposed so that their axes lie at right angles to the surface of the parts of the scale which are to be viewed. The light through both microscopes entering the telescope bearing is reflected along the axis of the bearing by a pair of prisms mounted in a cell within the bearing itself.

In order that the invention may be clearly understood and readily carried into effect, some constructional arrangements in accordance therewith are illustrated in the accompanying drawings in which:—

Figure 4 shows an enlarged view of the scales as seen simultaneously in the eyepiece of the reading instrument, while Figures 5 and 6 are diagrammatic plans of alternative arrangements;

Figure 1:
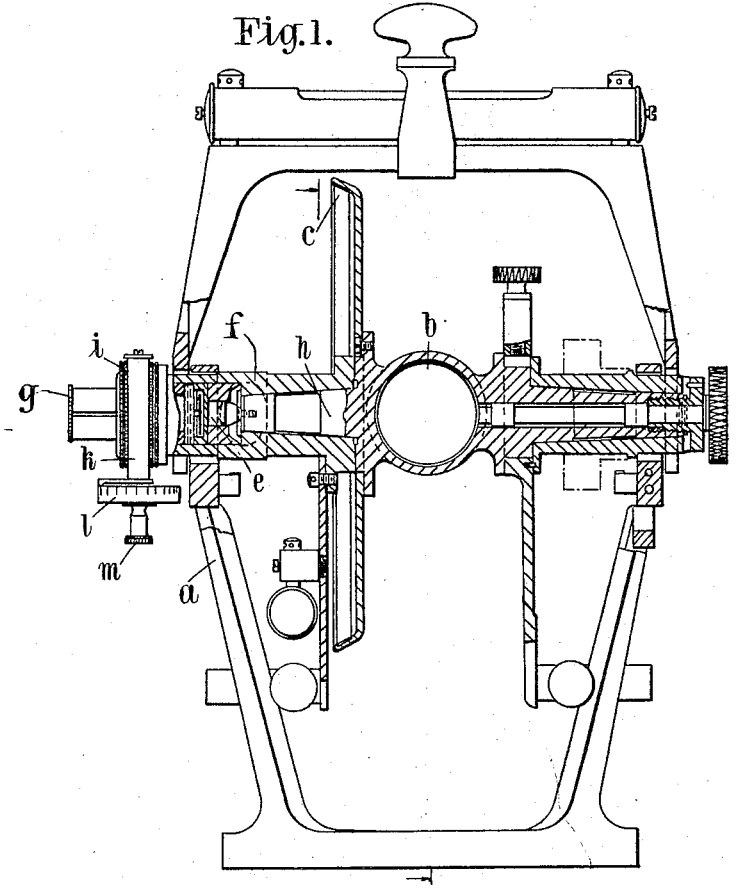
Figure 1 is an elevation partly in section of a theodolite to which the invention is applied.
Figure 2:
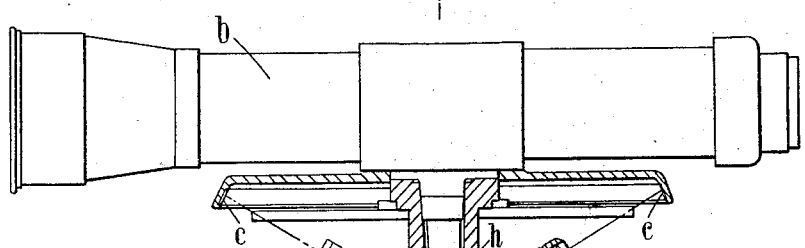
Figure 2 is a plan view of the telescope of such an instrument with the scale and optical system associated therewith in horizontal section.
Figure 2:
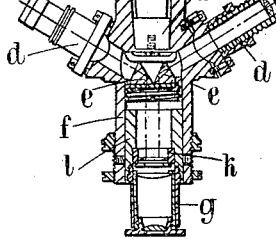
Figure 3:
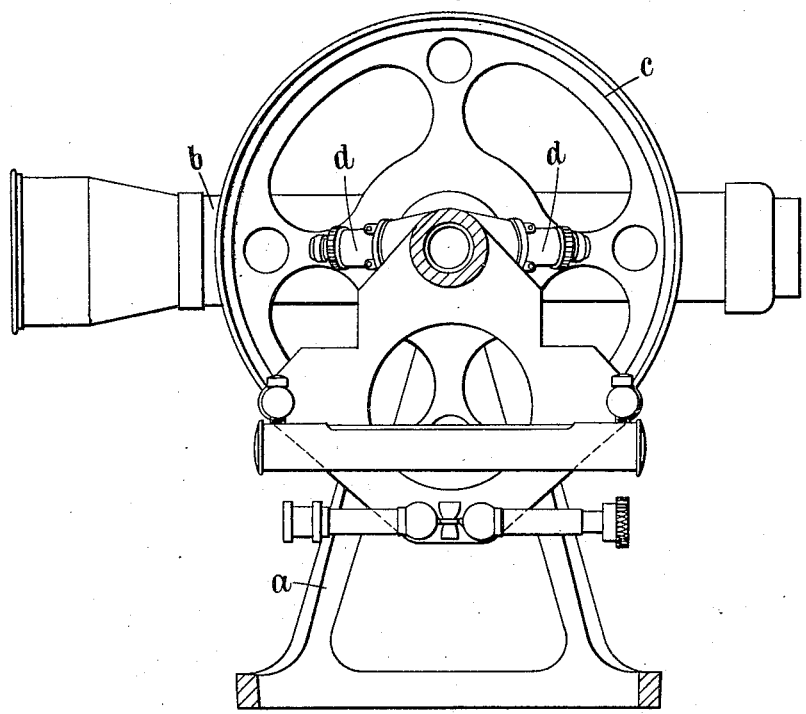
Figure 3 is a side elevation of the device with the frame largely omitted.

Referring to Figures 1 to 4, $a$ is the frame of a theodolite in which a telescope $b$ is mounted to turn about a horizontal axis, the telescope $b$ carrying a scale $c$ applied to to a disc attached thereto in the usual manner. The graduations on the scale are not illustrated in the drawings but any usual method of graduation may be adopted. In the enlarged view of the reading in Figure 4 it will be seen that it is supposed the graduations run in quadrants marked from 0 to 90 degrees which is one usual method of graduating the vertical scale $c$.

In order to enable simultaneous readings to be made at diametrically opposite points on the vertical scale $c$ for any position of the telescope $b$, an optical system is provided consisting substantially of two microscopes $d$ projecting at an angle from the horizontal axis about which the telescope tube $b$ turns, one at each side of the said axis and in such a direction that the axis of each microscope tube $d$ is at right angles to the surface of the scale $c$ at the point where the reading is to be taken. The scale $c$ is conical in form as will have been noticed. The light from the points on the scale $c$ is projected through the microscope tubes $d$ and reflected by the prisms $e$ substantially into the axis about which the telescope $b$ turns and passes through the bearing $f$ of the telescope into the eyepiece $g$ disposed in the axis of the instrument. The eyepiece and the microscope tubes $d$ are thus mounted on the stationary bearing $f$ into which projects the revoluble spindle $h$ on which the telescope tube $b$ is carried at this side of the instrument. Between the eyepiece $g$ and the prisms $e$ is disposed a rectangular guide $i$ in which slides a frame $k$ which can be adjusted vertically by means of a micrometer $l$ and knob or milled head $m$. The adjustment of the micrometer $l$ serves to raise and lower the frame $k$ which carries cross wires or webs $n$. In front of the sliding frame $k$ is a mask having a notch $o$ therein which serves to indicate that the cross wires $n$ are in the true zero position and avoids the risk that they shall be assumed to be in the zero position when the micrometer head has been given a complete turn away from its zero position.

Figure 4:
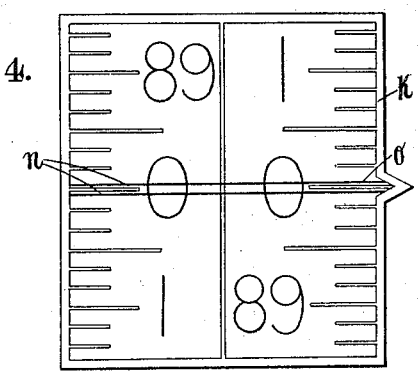

With the optical system as shown, the readings at diametrically opposite points on the two scales appear as indicated in Figure 4 one beside the other so that the cross wires $n$ can read across both scales simultaneously. As the axis of each microscope $d$ is perpendicular to the surface of the scale at the place where a reading is to be taken and as the reflecting prisms $e$ serve to reflect the beams of light for each reading parallel with the horizontal axis of the telescope, it will be seen that two images of the portions of the scale to be read are obtained, and there is no splitting of the images such as would be necessary if cross prisms were used for example.

The graduations on the micrometer drum $l$ are not indicated in the drawings, but it will be seen from Figure 4 the vertical scale of the telescope is graduated in divisions of degrees each constituting ten minutes of angle. The micrometer may then be arranged so that a complete revolution of its head $l$ serves to move the zero lines $n$ over one division, that is to say, ten minutes of angle on the scales to be read. If then the micrometer drum $l$ has sixty divisions, each of its divisions will correspond to ten seconds of angle. In determining the position of the telescope, the micrometer drum $l$ is turned until the lines $n$ coincide with the nearest graduation on one portion of the scale, that is to say, until the two lines $n$ have a graduation on the one scale lying mid-way between them as viewed by the eye. The necessary movement of the micrometer from the zero position gives the true reading on that portion of the scale, and a similar reading is then taken for the other portion of the scale as viewed through the eyepiece simultaneously. The average of the two micrometer readings gives the reading required to be added to the reading of the scale as viewed directly through an eyepiece.

In Figures 5 and 6, somewhat modified forms of the optical systems are shown. In these cases, the vertical scale $c$ of the theodolite is flat. The light from the two portions of the scale to be read is first reflected towards the axis about which the scale $c$ and telescope turns by a pair of reflecting prisms, $p, q$ and then enters the microscopes $d$. It is next reflected by a pair of prisms $e$ which are mounted in the telescope bearing exactly as shown in detail in Figure 2. Thus the light next passes through the bearing substantially in the axis about which the telescope turns and in Figure 5, it immediately enters the eyepiece $g$ exactly in the same manner as in Figure 2.

In Figure 6, however, before entering the eyepiece $g$, it is again reflected at right angles and, for this purpose, an additional reflecting prism $r$ is also mounted in the fixed bearing of the telescope.

Having thus described my invention what I claim as new and desire to secure by Letters Patent is:—

1. In a theodolite, the combination of a frame, a telescope mounted to turn about a horizontal axis in a part of said frame forming bearings for said telescope, a vertical conical scale fixed to said telescope to turn therewith and an optical system carried by one of said bearings and comprising microscope tubes directed towards two portions of said scale and at right angles to its surface and thus inclined to said horizontal axis to direct rays of light from the scale to a point within said bearing, means for reflecting the rays of light axially through said bearing and means for viewing the portions of said scale side by side.

2. In a theodolite, the combination of a frame, a telescope mounted to turn about a horizontal axis in a part of said frame forming bearings for said telescope, a vertical scale conical in form mounted also in said frame to turn around a horizontal axis, a pair of microscope tubes disposed about the axis around which said scale turns so as to be directed at right angles to the surface of diametrically opposite portions of said scale and thus inclined to said horizontal axis, a pair of prisms mounted to reflect the light from said tubes and an eyepiece having its axis coinciding with the horizontal axis of rotation of said telescope and arranged to receive the reflected light.

3. In a theodolite, the combination of a frame, horizontal bearings carried thereby, one of which is formed with an axial tubular extension, a telescope journalled in said bearings, a vertical scale of conical form secured to said telescope to turn therewith, a pair of microscope tubes carried by said bearing and directed towards diametrically opposite portions of said scale and at right angles to the surface thereof and thus inclined to the axis of said telescope bearings so as to conduct rays of light from said portions of said scale into said tubular extension, a pair of reflecting prisms mounted within said tubular extensions so as to reflect the rays of light axially and an eyepiece carried axially in the end of said tubular extension to allow the two portions of said scale to be viewed side by side.

4. In a theodolite, the combination of a frame, horizontal bearings carried thereby, one of which is formed with an axial tubular extension, a telescope journalled in said bearings, a vertical scale of conical form secured to said telescope to turn therewith, a pair of microscope tubes carried by said bearing and directed towards diametrically opposite portions of said scale and at right angles to the surface thereof and thus inclined to the axis of said telescope bearings, so as to conduct rays of light from said portions of said scale into said tubular extension, a pair of reflecting prisms mounted within said tubular extension so as to reflect the rays of light axially, an eyepiece carried axially in the end of said tubular extension to allow the two portions of said scale to be viewed side by side, a vertically sliding frame disposed in said tubular extension between said prisms and said eyepiece, cross wires carried by said frame for taking readings on both portions of said scale and a micrometer for adjusting said frame.

In witness wehereof, I hereunto subscribe my name this 27th day of April, A. D. 1923.

R. M. ABRAHAM.